(12) United States Patent
Hong et al.

(10) Patent No.: US 7,365,114 B2
(45) Date of Patent: Apr. 29, 2008

(54) FLAMEPROOF STYRENIC RESIN COMPOSITION

(75) Inventors: Sang Hyun Hong, Gyeonggi-do (KR); Yae Ho Yang, Gyeonggi-do (KR); Young Sik Ryu, Gyeonggi-do (KR)

(73) Assignee: Cheil Industries Inc., Geongsangbuk-do (KR)

( * ) Notice: Subject to any disclaimer, the term of this patent is extended or adjusted under 35 U.S.C. 154(b) by 0 days.

(21) Appl. No.: 10/529,327

(22) PCT Filed: Sep. 15, 2003

(86) PCT No.: PCT/KR03/01864

§ 371 (c)(1),
(2), (4) Date: Mar. 25, 2005

(87) PCT Pub. No.: WO2004/029143

PCT Pub. Date: Apr. 8, 2004

(65) Prior Publication Data

US 2006/0041040 A1    Feb. 23, 2006

(30) Foreign Application Priority Data

Sep. 25, 2002 (KR) ................ 10-2002-0058147

(51) Int. Cl.
*C08K 5/527* (2006.01)
(52) U.S. Cl. ................. 524/119; 524/117
(58) Field of Classification Search ........... 524/117, 524/119
See application file for complete search history.

(56) References Cited

U.S. PATENT DOCUMENTS

| | | | |
|---|---|---|---|
| 3,639,506 A | | 2/1972 | Haaf |
| 3,789,091 A | | 1/1974 | Anderson et al. |
| 3,789,901 A | | 2/1974 | Rishovd |
| 3,849,368 A | | 11/1974 | Anderson et al. |
| 3,883,613 A | | 5/1975 | Cooper |
| 4,273,881 A | | 6/1981 | Otten |
| 4,397,759 A | | 8/1983 | Hancock |
| 4,459,381 A | * | 7/1984 | Trivedi ............... 524/130 |
| 4,526,917 A | | 7/1985 | Axelrod |
| 4,618,633 A | * | 10/1986 | Taubitz et al. ............ 524/80 |
| 4,632,946 A | * | 12/1986 | Muench et al. ........... 523/179 |
| 4,914,144 A | | 4/1990 | Muehlbach et al. |
| 5,030,674 A | * | 7/1991 | Notorgiacomo, Jr. ....... 524/117 |
| 5,276,256 A | | 1/1994 | Niessner et al. |
| 5,710,305 A | | 1/1998 | Archer et al. |
| 5,859,147 A | | 1/1999 | Dalla Torre et al. |
| 6,054,515 A | * | 4/2000 | Blount ................. 524/118 |
| 6,262,166 B1 | | 7/2001 | Yoshida et al. |
| 2006/0183825 A1 | | 8/2006 | Ahn et al. |
| 2006/0183826 A1 | | 8/2006 | Ryu et al. |
| 2006/0189729 A1 | | 8/2006 | Bae et al. |
| 2006/0189730 A1 | | 8/2006 | Hong et al. |
| 2007/0032579 A1 | | 2/2007 | Ku et al. |

FOREIGN PATENT DOCUMENTS

| | | | |
|---|---|---|---|
| DE | 4209029 | * | 9/1993 |
| EP | 0 731 140 A2 | | 9/1996 |
| EP | 1 069 157 A1 | | 1/2001 |
| EP | 1 069 158 A1 | | 1/2001 |
| EP | 1 070744 A2 | | 1/2001 |
| JP | 61-009450 | | 1/1986 |
| JP | 11-501348 | | 9/1996 |

OTHER PUBLICATIONS

Abstract of WO 9627637 published Sep. 12, 1996.
Abstract of published Japanese Application 61-009450 published Jan. 17, 1986.
Unpublished U.S. Appl. 11/601,352, filed Nov. 17, 2006 for Ku et al.
Abstract of Korean Publication No. KR 2004 0058773 published Jul. 5, 2004.
Abstract of Korean Publication No. KR 2004 0027104 published Apr. 1, 2004.
Abstract of Korean Publication No. KR 2003 0030421 published Apr. 18, 2003.
Abstract of Korean Publication No. KR 2001 0009848 published Feb. 5, 2001.
Abstract of Korean Publication No. KR 2001 0083602 published Sep. 1, 2001.

(Continued)

*Primary Examiner*—Peter Szekely
(74) *Attorney, Agent, or Firm*—Maria Parrish Tungol

(57) ABSTRACT

The flameproof styrenic resin composition according to the present invention comprises (A) about 70 to 99.5 parts by weight of a rubber-modified polystyrene resin and (B) about 0.5 to 20 parts by weight of a ring-shaped alkyl phosphonic acid compound represented by the following formula: wherein $R_1$ and $R_2$ are independently of each other $C_1$-$C_4$ alkyl and x is 0 or 1

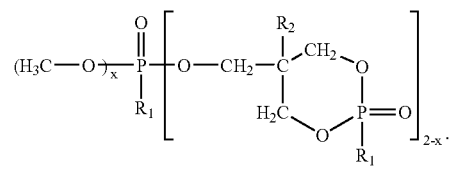

6 Claims, No Drawings

OTHER PUBLICATIONS

Abstract of Korean Publication No. KR 2004 0003563 published Jan. 13, 2004.
Abstract of Korean Publication No. KR 2003 0078189 published Oct. 8, 2003.
Abstract of Japanese Publication No. JP 11343382 published Dec. 14, 1999.
Abstract of Japanese Publication No. JP 10195287 published Jul. 28, 1998.
Abstract of Japanese Publication No. JP 60079048 published May 4, 1985.
Abstract of Japanese Publication No. JP 1140270 published May 25, 1999.
Abstract of Japanese Publication No. JP 2001040172 published Feb. 13, 2001.
Abstract of WO 98 11160 published Mar. 19, 1998.
Abstract of WO 00 17268 published Mar. 30, 2000.

* cited by examiner

FLAMEPROOF STYRENIC RESIN COMPOSITION

FIELD OF THE INVENTION

The present invention relates to a flame retardant styrenic resin composition which has excellent flame retardancy, heat resistance and mechanical strength. More particularly, the present invention relates to a flame retardant rubber-modified polystyrene resin composition employing a ring-shaped alkyl phosphonic acid ester compound as a flame retardant to a base resin consisting of rubber modified polystyrene resin.

BACKGROUND OF THE INVENTION

A styrenic resin is excellent in mold processability and mechanical properties, therefore, the resin has been widely applied to electric appliances. However the styrenic resin is extremely easily flammable, which can easily make a fire accident. In this regard, the resin is subjected to various mandatory controls on their flammability for the safety reason in United States, Japan and Europe and is required to have high flame retardancy to meet the Underwriter's Laboratories Standard for the use of the housing of electric appliances.

A widely known method for flame retardancy is that a halogen-containing compound and an antimony-containing compound are added to a rubber modified styrene-containing resin to give a good flame-retardant property. The examples of the halogen-containing compounds used in the method above are, for example, polybromodiphenyl ether, tetrabromobisphenol-A, epoxy compounds substituted by bromine, chlorinated polyethylene, etc. An antimony trioxide or an antimony pentaoxide is commonly used as an antimony-containing compound.

The methods for improving the flame-retardant property by applying a halogen- and antimony-containing compound have advantages such as easy acquirement of the flame-retardant property and no degradation of the physical properties. However, the disadvantages could be observed that the halogen-containing compound results in the corrosion of the mold itself by the hydrogen halide gases released during the molding process and is fatally harmful due to the toxic gases liberated in case of fire. Especially, since a polybromodiphenyl ether, mainly used for a halogen-containing flame retardant, can produce toxic gases such as dioxin or furan during combustion, a major concern in this field is to develop a flame retardant which is prepared without a halogen-containing compound.

U.S. Pat. No. 4,526,917 discloses use of a TPP and a mono phosphoric acid ester compound having a mesityl group to a base resin comprising a polyphenylene ether resin and a styrenic resin to improve flame retardancy of the resin composition. However, in the patent, the amount of polyphenylene ether is more than 20%, which makes it difficult to obtain dripping flame retardancy while maintaining its flowability. Moreover, the heat resistance of the resin composition is lowered due to addition of TPP.

Japanese Patent Application No. 7-043,769 discloses that the use of phosphoric acid ester compound having a substituent containing 12 to 25 carbon atoms derived from TPP may obtain flame-retardancy of V2 and improved volatility at 250° C.

U.S. Pat. Nos. 3,789,091 and 3,849,368 disclose that a ring-type phosphonic acid ester compound can be used as a flame retardant to a polyethylene terephthalate, PAN, polyurethane, polystyrene or nylon.

In view of the above-mentioned patents, there have been many attempts to provide flame retardancy by using a phosphoric acid ester compound as a halogen-free flame retardant, but none of the publication discloses a resin composition with good mechanical strength, heat resistance and dripping flame-retardancy without polyphenylene ether by using only phosphorus-based compound and rubber modified polystyrene resin.

So, the present inventors have developed a flame retardant styrenic resin composition which has good flame retardancy as well as mechanical strength and heat resistance by employing a ring-shaped alkyl phosphonic acid ester compound as a flame retardant to a base resin consisting of rubber modified polystyrene resin. The resin composition of the present invention may further contain polyphenylene ether optionally.

SUMMARY OF THE INVENTION

The flameproof styrenic resin composition according to the present invention comprises (A) 70 to 99.5 parts by weight of a rubber-modified polystyrene resin, (B) 0.5 to 20 parts by weight of a ring-shaped alkyl phosphonic acid ester compound and, optionally, (C) 0 to 10 parts by weight of a polyphenylene ether.

The compositions according to the present invention provide an environment-friendly flame retardant styrenic resin composition having stability for fire, good heat resistance and does not cause toxic gases in case of fire. The compositions according to the present invention have good mechanical strength making them useful for the housing of electric appliances.

DETAILED DESCRIPTION OF THE INVENTION (A) Rubber-modified Polystyrene Resin

A rubber-modified polystyrene resin used in the present invention as a base resin can be prepared by blending a rubber, an aromatic mono-alkenyl monomer and/or alkyl ester monomer and polymerizing with heat or a polymerization initiator.

The Rubber which can be used in this invention includes polybutadiene, polyisoprenes, styrene-butadiene copolymers and alkylacrylic rubbers. The amount of the rubber is 3 to 30 parts by weight, preferably 5 to 15 parts by weight.

Further, the monomer used in rubber-modified polystyrene is one or more monomer selected from the group consisting of aromatic mono-alkenyl monomer, alkyl ester monomers of acrylic acid or methacrylic acid and is used in an amount of 70-97 parts by weight, preferably 85-95 parts by weight.

The resin composition of the present invention can be polymerized with heat or a polymerization initiator. The polymerization initiator used in the present invention may be one or more selected from the group consisting of organic peroxides such as benzoyl peroxide, t-butyl hydroperoxide, acetyl peroxide and cumene hydroperoxide or azo compounds such as azobisisobutyronitrile (AIBN).

The rubber-modified polystyrene resin of the present invention can be produced by a known polymerization method such as bulk polymerization, suspension polymerization, emulsion polymerization or combination thereof. Among them, the bulk polymerization is preferred. To acquire optimum physical properties in consideration of the blend of rubber-modified polystyrene resin and polyphenylene ether, the average size of rubber particles is preferably in the range of from 0.5 to 2.0 μm.

(B) Ring-shaped Alkyl Phosphonic Acid Ester Compound

The ring-shaped alkyl phosphonic acid ester compound of the present invention is represented by the following chemical Formula (I):

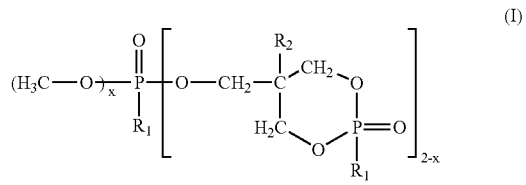

wherein $R_1$ and $R_2$ are independently of each other $C_1$-$C_4$ alkyl and x is 0 or 1.

Examples of the ring-shaped alkyl phosphonic acid ester compound having the structural formula (I) include methyl-bis (5-ethyl-2-methyl-1,3,2-dioxaphosphorinan-5yl) methyl methyl phosphonic acid ester P-oxide or methyl-bis(5-ethyl-2-methyl-1,3,2-dioxanhosphorinan-5yl) phosphonic acid ester P, P'-dioxide.

The ring-shaped alkyl phosphonic acid ester compound (B) of present invention is used in the amount of from 0.5 to 20 parts by weight, preferably 0.5 to 6 parts by weight, more preferably 0.5 to 2 parts by weight per 70 to 99.5 parts by weight of the rubber modified styrenic resin (A). If the amount of the ring-shaped alkyl phosphonic acid ester compound is added less than 0.5 parts by weight, the resin composition has poor flame retardancy. On the other hand, if the amount of the ring-shaped alkyl phosphonic acid ester compound is more than 20 parts by weight, heat resistance of the resin composition is lowered.

(C) Polyphenylene Ether (PPE)

Polyethylene ether is added to the rubber-modified styrenic resin to improve flame retardancy and heat resistance.

Examples of the polyphenylene ether resin include poly (2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-pheylene) ether and poly(2,3,5-triethyl-1,4-phenylene) ether. Preferably, copolymer of poly (2,6-dimethyl-1,4-phenylene) ether and poly(2,3,6-trimethyl-1,4-phenylene) ether, and poly(2,6-dimethyl-1,4-phenylene) ether are preferably used, more preferably poly (2,6-dimethyl-1,4-phenylene) ether is preferably used.

The degree of polymerization of polyphenylene ether is not limited specifically, but considering heat-stability or processability of the resin composition, it is preferable that the viscosity of polypheylene ether is in the range of about 0.2 to 0.8 measured in chloroform solvent at 25° C.

The flame retardant resin composition of the present invention may further contain conventional plastic additives, for example, plasticizers, heat stabilizers, anti-oxidants, light stabilizers, compatibilizers, pigment, dye and/or inorganic filler. The inorganic filler can be asbestos, glass fiber, talc, ceramic and sulfonate etc. The additives are employed in the amount of 0 to 50 parts by weight on the basis of 100 parts by weight of the base resin.

The present invention may be better understood by reference to the following examples that are intended for the purpose of illustration and are not to be construed as in any way limiting the scope of the present invention, which is defined in the claims appended hereto. In the following examples, all parts and percentage are by weight unless otherwise indicated.

EXAMPLES

The components to prepare flame retardant styrenic resin compositions in Examples 1~6 and Comparative Examples 1~2 are as follows:

(A) Rubber Modified Polystyrene Resin

HIPS(High Impact Polystyrene) of Cheil Industries Inc. (Product name: HR-1380F) was used. The particle size of butadiene rubber was 1.5 μm. And the content of rubber was 6.5% by weight.

(B) Ring-shaped Alkyl Phosphonic Acid Ester Compound

Antiblaze 1045 of Rhodia Co. which contains 20.8% of phosphorus [a mixture of 8% by weight of methyl-bis(5-ethyl-2-methyl-1,3,2-dioxaphorinan-5yl) methyl methyl phosphonic acid ester P-oxide and 85% by weight of methyl-bis (5-ethyl-2-methyl-1,3,2-dioxaphorinan-5yl) phosphonic acid ester P,P'-dioxide] was used.

(B') Aromatic Phosphoric Acid Ester Compound

Triphenylphosphate with a melting point of 48° C. was used.

(C) Polyphenylene Ether Resin (PPE)

A poly(2,6-dimethyl-1,4-phenylene)ether by Asahi Co. of Japan (Product name: P-402) was used as PPE. The particles had the average size of several microns (μm) and were in the form of powder.

Examples 1~6

The components as shown in Table 1 were mixed and the mixture was extruded at 200~280° C. with a conventional twin screw extruder in pellets. The resin pellets were dried at 80° C. for 3 hours, and molded into test specimens for measuring flame retardancy using a 6 oz injection molding machine at 180~280° C. and barrel temperature of 40~80° C.

The flame retardancy of the test specimens was measured in accordance with UL94VB with a thickness of ⅛". The impact strength was measured according to Izod impact strength ASTM D-256 A (⅛" notch). The heat resistance was measured according to ASTM D-1525 under 5 kg. The color and heat stability was measured according to ASTM D-4459 based on cream color. The test results are presented in Table 1.

TABLE 1

| | Examples | | | | | |
|---|---|---|---|---|---|---|
| | 1 | 2 | 3 | 4 | 5 | 6 |
| (A) HIPS | 100 | 100 | 100 | 100 | 100 | 100 |
| (B) Ring-shaped Alkyl Phosphonic Acid Ester Compound | 3 | 6 | 3 | 3 | 1.5 | 1.5 |
| (C) PPE | — | — | 5 | 10 | — | 5 |

TABLE 1-continued

|  | Examples | | | | | |
| --- | --- | --- | --- | --- | --- | --- |
|  | 1 | 2 | 3 | 4 | 5 | 6 |
| UL94 flame retardancy (⅛") | V2 | V2 | V2 | V2 | V2 | V2 |
| Izod impact strength ⅛" (kgf · cm/cm) | 10 | 9 | 10 | 9 | 11 | 10 |
| Vicat Softening Temperature (° C.) | 92 | 89 | 97 | 102 | 94 | 99 |
| color and heat stability (DE) | 0.4 | 0.6 | 0.4 | 0.4 | 0.2 | 0.2 |

Comparative Examples 1~2

Comparative Examples 1 was conducted in the same manner as in Example 1 except that triphenylphosphate was used as a flame retardant instead of the ring-shaped alkyl phosphonic acid ester compound. Comparative Example 2 was conducted in the same manner as in Example 4 except that triphenylphosphate was used as a flame retardant instead of the ring-shaped alkyl phosphonic acid ester compound. The test results are presented in Table 2.

TABLE 2

|  | Comparative Example 1 | Comparative Example 2 |
| --- | --- | --- |
| (A) HIPS | 100 | 100 |
| (B') triphenylphosphate | 8 | 8 |
| (C) PPE | — | 10 |
| UL 94 flame retardancy (⅛") | Fail | Fail |
| Izod impact strength ⅛" (kgf · cm/cm) | 5 | 6 |
| Vicat Softening Temperature (° C.) | 73 | 80 |
| Color and heat stability (DE) | 0.2 | 0.3 |

As shown above, the resin compositions employing a ring-shaped alkyl phosphonic acid ester compound as a flame retardant show good flame retardancy and heat resistance without no deterioration of impact strength compared to those employing an aromatic phosphoric acid ester compound.

The present invention can be easily carried out by an ordinary skilled person in the art. Many modifications and changes may be deemed to be with the scope of the present invention as defined in the following claims.

What is claimed is:

1. A flame retardant styrenic resin composition comprising:
   (A) 70 to 99.5 parts by weight of a rubber-modified polystyrene resin; and
   (B) 0.5 to 2 parts by weight of a ring-shaped alkyl phosphonic acid ester compound represented by the following formula (I):

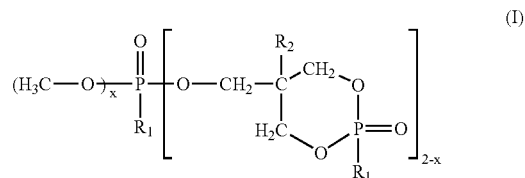

wherein $R_1$ and $R_2$ are independently of each other $C_1$-$C_4$ alkyl and x is 0 or 1 and wherein the concentration of polyphenylene ether in the composition is 0.

2. The flame retardant styrenic resin composition as defined in claim 1, which further comprises up to 50 parts by weight of an additive selected from the group consisting of plasticizers, heat stabilizers, anti-oxidants, light stabilizers, compatibilizers, pigment, dye and/or inorganic filler per 100 parts by weight of rubber modified styrenic resin (A).

3. A flame retardant styrenic resin composition comprising:
   (A) 70 to 99.5 parts by weight of a base resin prepared by blending a rubber, and styrene monomer and polymerizing the blend, and
   (B) 0.5 to 2 parts by weight of a ring-shaped alkyl phosphonic acid ester compound represented by the following formula (I):

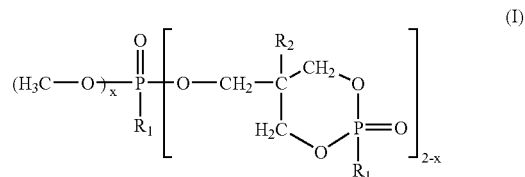

wherein $R_1$ and $R_2$ are independently of each other $C_1$-$C_4$ alkyl and x is 0 or 1 and wherein the concentration of polynbenylene ether in the composition is 0.

4. A flame retardant styrenic resin composition according to claim 1 wherein (B) is methyl-bis (5-ethyl-2-methyl-1,3,2-dioxaphosphorinan-5y1) methyl methyl phosphonic acid ester P-oxide or methyl-bis(5-ethyl-2-methyl-1,3,2-dioxaphosphorinan-5yl) phosphonic acid ester P, P'-dioxide or a mixture thereof.

5. A flame retardant styrenic resin composition according to claim 1 wherein the particle size of the rubber is from 0.5 to 2.0 μm.

6. A flame retardant styrenic resin composition according to claim 3 herein the particle size of the rubber is from 0.5 to 2.0 μm.

* * * * *